Patented July 19, 1949

2,476,809

UNITED STATES PATENT OFFICE 2,476,809

MANUFACTURE OF PYRIMIDINO(4,5-b) PYRAZINES

William F. Bruce, Haverton, and William J. McDermott, Drexel Hill, Pa., assignors to Wyeth Incorporated, Philadelphia, Pa., a corporation of Delaware No Drawing. Application April 3, 1946, Serial No. 659,438

15 Claims. (Cl. 260—251)

This invention relates to a new process for the manufacture of pyrimidine condensation products and more specifically to a new process for the manufacture of 6-hydroxypyrimido (4,5-b) pyrazine compounds similar to xanthopterin.

In accordance with the present invention 6-hydroxypyrimido (4,5-b) pyrazines are directly obtained by reacting a 4,5-diamino-pyrimidine with a dialkoxy acetate at an elevated temperature preferably within the range of 90–100° C.

The process is operable with 4,5-diaminopyrimidine and with its nuclear substitution compounds, for example, the thioamino-, hydroxy- and alkyl-substitution products of 4,5-diamino-pyrimidine. More specifically, the process may be carried out using as starting materials such substitution products as 2,4,5-triamino-pyrimidine; 2,4,5 - triamino - 6 - hydroxy pyrimidine; 4,5-diamino-2,6-dihydroxy-pyrimidine; 3-methyl-2,6, dihydroxy pyrimidine; 3-propyl-2,6 dihydroxy-pyrimidine; 2 - thio - 4,5-diamino-pyrimidine; 2-thio-4,5,6 triaminopyrimidine and 2-thio-4,5 diamino-6-hydroxypyrimidine. In substance, any nuclear substitution product of 4,5-diamino-pyrimidine may be used.

It is furthermore within the scope of this invention to use a 4,5 diamino-pyrimidine either as a free base or the acid-addition salt thereof. While the sulfate addition salt is preferred, the hydrochloride, the nitrate or addition salts of other inorganic acids may be used. Since the free base tends toward oxidation, it is preferred to use an acid-addition salt rather than the free base itself.

In carrying out the process for producing 6-hydroxy-pyrimdo (4,5-b) pyrazines, it has been found that in general, alkali metal salts, alkaline earth metal salts and alkyl esters of dialkoxy acetic acid will react with the 4-5 diamino-pyrimidines to produce 6-hydroxypyrimido (4,5-b) pyrazines in a simple and efficacious manner.

The dialkoxy compounds that may be used have the general formula

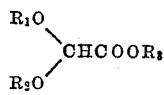

where $R_1$ and $R_2$ are alkyl radicals, preferably those having 1 to 4 carbon atoms in the molecule and more preferably the methyl radical, while $R_3$ may either be an alkyl radical of 1 to 4 carbon atoms in the molecule, but preferably the methyl radical or an alkali metal, but preferably sodium or an alkaline earth metal and preferably calcium.

The process in general is carried out by adding the particular 2,4 diamino-pyrimidine, preferably its acid-addition salt and more preferably its sulfate salt with the dialkoxy acetate, to hot sulfuric acid maintained at a temperature in the range of 90–100° C., preferably 95° C.

It has been found that the reaction is best carried out in an inert or reducing atmosphere in order to prevent oxidation and consequently impure products. Thus, when the reaction takes place in the absence of air spectroscopically pure products are obtained in substantial yields. To obtain this condition, the reaction is carried out in the presence of an inert or reducing gas such as nitrogen, carbon dioxide, hydrogen, hydrogen sulfide or sulfur dioxide. The gas used may be passed through the reaction mixture during the entire time of the condensation particularly when using one of the first three gases mentioned, but the reaction mixture may merely be saturated with the gas only at the beginning and preferably when using hydrogen sulfide or sulfur dioxide, the latter method is considered best, the sulfuric acid being first saturated with the gas before adding the 4,5-diamino-pyrimidine and the dialkoxy acetate in admixture to the acid. The gas used for securing the inert or reducing atmosphere may be obtained from an extraneous source or may be made in situ. In the latter case, one merely adds a material in the acid reaction zone given rise to the gas desired. In the case of $SO_2$ or $H_2S$, the amount of the compound added should be chemically equivalent to the amount of dialkoxy acetate for optimum yields. It should be emphasized that the reaction will take place in the presence of air with substantial yields, but the product obtained is not spectroscopically pure.

In the manufacture of pyrimidine condensation products, a biologically important member is xanthopterin, 2-amino-4,6-dihydroxy pyrimido (4,5-b) pyrazine. This important compound can be made, in accordance with this process, by the reaction of 2,4,5 triamino-6 hydroxy pyrimidine, preferably its sulfate salt, with a dialkoxy acetate and preferably sodium dimethoxy acetate. In view of its present biological importance, particular emphasis, as illustrated by the specific examples, is directed to the manufacture of this specific compound.

A few processes for the manufacture of xanthopterin have been proposed. In comparison with the simple reaction disclosed by this invention, these processes involve the use of expensive and difficultly obtainable reactants, complicated and multitudinous steps and in general, results in impure xanthopterin due to the difficulty of removing occluded reaction products.

In one proposed method for the preparation of xanthopterin, as reported in the literature, 2,4,5-triamino-6-pyrimidol sulfate was reacted with the barium salt of the bisulfite derivative of glyoxylic acid. The objection to this method is that the xanthopterin obtained is spectroscopically impure due to the difficulty of separating occluded barium salt and last but not least, the further difficulty of preparing the barium salt of the bisulfite derivative of gyoxylic acid. On the other hand, dialkoxy acetate is easy to prepare and there is no difficulty in obtaining a pure product.

The invention is further illustrated by the following examples and while Examples I to V are specifically directed to the manufacture of xanthopterin because of its importance, it is emphatically not intended that it be restricted thereto.

*Example I*

For the preparation of sodium dimethoxy acetate, 162 grams of sodium methylate is dissolved in 800 cc. of absolute alcohol. The solution is cooled and 129 grams of dichloroacetic acid is gradually added under anhydrous conditions. The mixture is refluxed for 3 hours, cooled and the sodium chloride is filtered off. The filtrate is concentrated to dryness under reduced pressure. The residue is dissolved in a minimum amount of water and neutralized with dilute hydrochloric acid. The aqueous solution is again concentrated to dryness under reduced pressure. The residue is extracted with three 200 cc. portions of absolute alcohol and the combined extracts are concentrated to dryness, under reduced pressure. The yield is 90 grams. The sodium dimethoxy acetate decomposes at a temperature of 172–174° C. For further purification, the residue is dissolved in hot absolute alcohol and allowed to crystallize therefrom on cooling. The crystallization is aided by seeding or by scratching the container.

The above described reaction may be illustrated by the following equation:

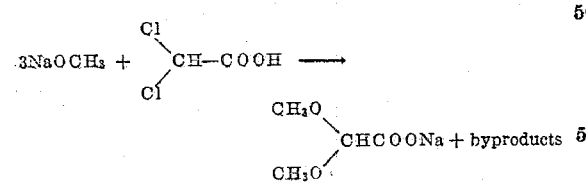

For preparing any alkali or alkaline earth metal salt of dimethoxy acetic acid, the above method of preparing the sodium salt can be followed. For the preparation of an alkyl ester, the method of Helferich and Russe, Ber. 56B, p. 762 (1923) teaching the preparation of the methyl ester may be followed.

For the preparation of xanthopterin, 6.43 grams (0.025 mol) of 2,4,5-triamino-6-hydroxy-pyrimidine sulphate monohydrate and 10.65 grams (0.075 mol) of recrystallized sodium dimethoxyacetate is added to 75 cc. of 78% sulfuric acid at about 95° C. Nitrogen is bubbled through the system during the entire condensation which requires about one hour at about 95° C. The reaction products are cooled and 25 cc. of water is added, the temperature being held below 15° C. by the use of ice. The liquid is filtered through a sintered glass funnel and the residue is washed with about 13 cc. of distilled water. The filtrate is cooled to permit the xanthopterin to precipitate. The precipitation is aided by scratching the container or by seeding and complete precipitation is generally obtained in 1 or 2 days. For purification, the precipitated xanthopterin is extracted with 200 cc. of a dilute mineral acid, such as hydrochloric or sulfuric acid, stirring for about 15 minutes and 0.6 gram of a vegetable charcoal is added, stirring being continued for about 5 minutes after which the charcoal is filtered off. The filtrate is cooled to about 0–15° C. and the xanthopterin is precipitated by neutralizing to a pH of 4–7 with an alkaline solution such as 28% ammonia solution, sodium bicarbonate or with solid sodium acetate. The xanthopterin precipitate is separated by centrifuging and washed four times with a minimum amount of distilled water. It is dried either by lyophilizing or with anhydrous methanol and anhydrous ether. The yield is 1.89 grams corresponding to about 42% of the theoretical. This material is analytically and spectroscopically pure and contains one mol of water per molecule of xanthopterin.

The following equation illustrates the reaction:

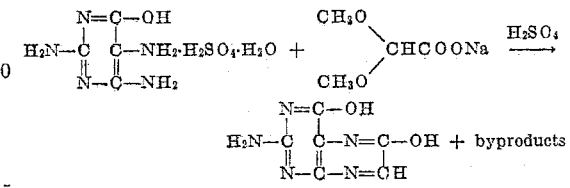

*Example II*

The same procedure is carried out as in Example I, except that sulfur dioxide instead of nitrogen is passed through the reaction mixture during the entire time of the condensation. The yield is about 17% of theoretical and the purity is about 90%.

*Example III*

In using methyldimethoxy acetate, prepared according to the aforesaid method of Helferich et al. the same procedure for the manufacture of xanthopterin is carried out as indicated in Example I, except that 35 grams of methyl dimethoxy acetate is used and sulfur dioxide instead of nitrogen is passed through the reaction mixture during the entire time of the condensation. The yield is about 11% of theoretical and the purity is about 90%.

*Example IV*

The same procedure is carried out as in Example I, except that the reactants are first saturated with sulfur dioxide in place of nitrogen without further additions of gas. The yield is about 28% of theoretical and the xanthopterin is analytically and spectroscopically pure.

*Example V*

The same procedure is carried out as in Example I, but in the absence of a reducing or inert gas. The yield is about 50% of theoretical with the product about 62% pure.

While the above examples illustrate the invention specifically with regard to xanthopterin the condensation of 4,5-diamino-pyrimidine and any of its hydroxy-, amino-, thio- and alkyl substitution products can be carried out under the conditions illustrated in the specific examples using an alkali, alkaline earth metal or alkyl dialkoxy acetate. For best results the reaction of the particular 4,5-diamino-pyrimidine with the particular dialkoxy acetate selected is carried out using one mol of the pyrimidine reactant to 3 to 5 mols of the dialkoxy acetate. In the case of the alkaline earth metal salts one mol of the pyrimidine reactant to 1.5 mols of the dialkoxy acetate would be sufficient.

We claim:

1. A process for the preparation of a pyrimidino (4,5-b) pyrazine which comprises condensing a 4,5-diaminopyrimidine compound with a dialkoxy acetate selected from the group consisting of alkali metal, alkaline earth metal and alkyl dialkoxy acetates in the presence of sulfuric acid maintained at an elevated temperature, and recovering said pyrimidino (4,5-b) pyrazine from the reaction products.

2. A process for the preparation of a pyrimidino (4,5-b) pyrazine which comprises condensing a 4,5-diaminopyrimidine acid-addition salt with a dialkoxy acetate selected from the group consisting of alkali metal, alkaline earth metal and alkyl dialkoxy acetates in the presence of sulfuric acid maintained at an elevated temperature and recovering said pyrimidino (4,5-b) pyrazine from the reaction products.

3. A process for the preparation of a pyrimidino (4,5-b) pyrazine which comprises condensing a 4,5-diaminopyrimidine compound with a dialkoxy acetate selected from the group consisting of alkali metal, alkaline earth metal and alkyl dialkoxy acetates, at an elevated temperature and in the presence of sulfuric acid and a gaseous medium selected from the group consisting of inert and reducing gases and recovering said pyrimidino (4,5-b) pyrazine from the reaction products.

4. A process for the preparation of xanthopterin which comprises condensing 2,4,5-triamino-6-hydroxy-pyrimidine acid-addition salt with a dialkoxy acetate selected from the group consisting of alkali metal, alkaline earth metal and alkyl dialkoxy acetates in the presence of sulfuric acid maintained at an elevated temperature, and recovering said xanthopterin from the reaction products.

5. A process for the preparation of xanthopterin which comprises condensing 2,4,5-triamino-6-hydroxy-pyrimidine acid-addition salt with a dimethoxy acetate selected from the group consisting of alkali metal, alkaline earth metal and alkyl dimethoxy acetates, at an elevated temperature and in th presence of sulfuric acid and a gaseous medium selected from the group consisting of inert and reducing gases and recovering said xanthopterin from the reaction products.

6. A process for the preparation of a pyrimidino (4,5-b) pyrazine which comprises condensing a 4,5-diamino-pyrimidine compound with sodium dimethoxy acetate in the presence of sulfuric acid maintained at an elevated temperature, and recovering said pyrimidino (4,5-b) pyrazine from the reaction products.

7. A process for the preparation of xanthopterin which comprises condensing 2,4,5-triamino-6-hydroxy-pyrimidine acid-addition salt with sodium dimethoxy acetate in the presence of sulfuric acid maintained at an elevated temperature, and recovering said xanthopterin from the reaction products.

8. A process for the preparation of xanthopterin which comprises condensing 2,4,5-triamino-6-hydroxy-pyrimidine acid-addition salt with sodium dimethoxy acetate, at an elevated temperature and in the presence of sulfuric acid and an inert gaseous medium and recovering said xanthopterin from the reaction products.

9. A process for the preparation of xanthopterin which comprises condensing 2,4,5-triamino-6-hydroxy-pyrimidine acid-addition salt with sodium dimethoxy acetate, at an elevated temperature and in the presence of sulfuric acid and a reducing gaseous medium and recovering said xanthopterin from the reaction products.

10. A process for the preparation of a pyrimidino (4,5-b) pyrazine which comprises condensing a 4,5-diamino pyrimidine compound with calcium dimethoxy acetate in the presence of sulfuric acid maintained at an elevated temperature, and recovering said pyrimidino (4,5-b) pyrazine from the reaction products.

11. A process for the preparation of xanthopterin which comprises condensing 2,4,5-triamino-6-hydroxy-pyrimidine acid-addition salt with calcium dimethoxy acetate in the presence of sulfuric acid maintained at an elevated temperature, and recovering said xanthopterin from the reaction products.

12. A process for the preparation of xanthopterin which comprises condensing 2,4,5-triamino-6-hydroxy-pyrimidine acid-addition salt with calcium dimethoxy acetate, at an elevated temperature and in the presence of sulfuric acid and an inert gaseous medium and recovering said xanthopterin from the reaction products.

13. A process for the preparation of a pyrimidino (4,5-b) pyrazine which comprises condensing a 4,5-diaminopyrimidine compound with methyl dimethoxy acetate in the presence of sulfuric acid maintained at an elevated temperature, and recovering said pyrimidino (4,5-b) pyrazine from the reaction products.

14. A process for the preparation of xanthopterin which comprises condensing 2,4,5-triamino-6-hydroxy-pyrimidine acid-addition salt with methyl dimethoxy acetate in the presence of sulfuric acid maintained at an elevated temperature, and recovering said xanthopterin from the reaction products.

15. A process for the preparation of xanthopterin which comprises condensing 2,4,5-triamino-6-hydroxy-pyrimidine acid-addition salt with methyl dimethoxy acetate, at an elevated temperature and in the presence of sulfuric acid and a reducing gaseous medium and recovering said xanthopterin from the reaction products.

WILLIAM F. BRUCE.
WILLIAM J. McDERMOTT.

REFERENCES CITED

The following references are of record in the file of this patent:

Annalen, vol. 546, pages 98–102 (1940).